July 11, 1944.  T. R. ARDEN  2,353,431
PROPELLER MOUNTING MEANS CONSTRUCTION
Filed Feb. 27, 1942
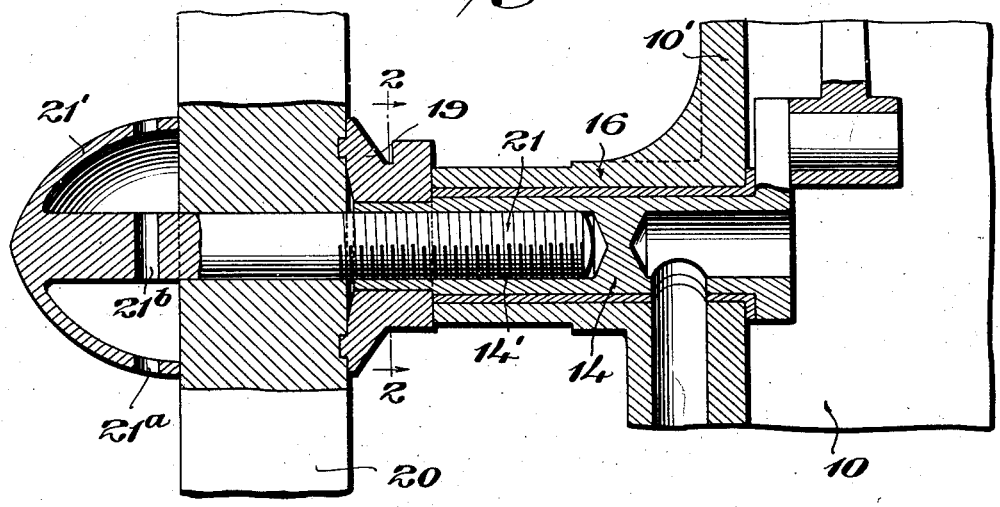
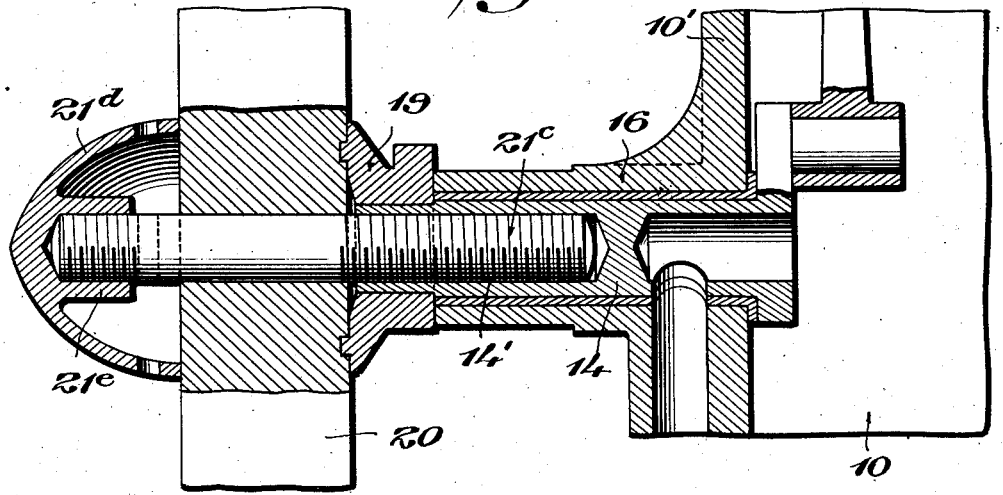
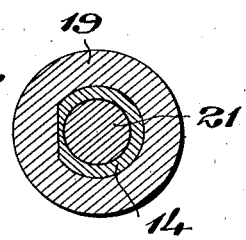
Inventor
Thomas R. Arden,
By Wolhaupter & Groff
Attorneys Patented July 11, 1944

2,353,431

UNITED STATES PATENT OFFICE 2,353,431

PROPELLER MOUNTING MEANS CONSTRUCTION

Thomas R. Arden, Danbury, Conn.

Application February 27, 1942, Serial No. 432,713

2 Claims. (Cl. 170—173)

This invention relates to miniature internal combustion engines for the propulsion of miniature aircraft, and has particular reference to improvements in means for connecting a propeller to the crank shaft of such an engine to avoid damage to the crank shaft in the event of crash of a miniature aircraft propelled by the engine.

More particularly, the invention relates to a miniature internal combustion engine and to means for connecting a propeller to the crank shaft thereof, as generally disclosed in my prior application, Serial No. 278,772, filed June 12, 1939, of which the present application is a continuation-in-part. Application 278,772 matured into Patent No. 2,274,644, dated March 3, 1942.

Heretofore it has been the general practice in the construction of miniature internal combustion engines for the propulsion of miniature aircraft to extend the crank shaft considerably beyond the crank case and to mount the propeller directly upon the projecting end portion of the crank shaft. This has had the serious disadvantage that when the aircraft crashes, as frequently happens, usually head-on, striking of the earth by the propeller almost invariably results in bending of the crank shaft and incapacitating the engine, necessitating replacement of the crank shaft and other repairs at material expense and loss of time insofar as use of the engine is concerned.

Generally speaking, the object of the present invention is to provide a miniature internal combustion engine for the propulsion of miniature aircraft embodying a crank shaft which does not project appreciably beyond the crank case and which, in any event, has its projecting end portion well supported and protected against becoming bent as the result of a crash, and, in addition, to provide novel, practical, inexpensive, readily replaceable means for mounting a propeller upon such a crank shaft so that in the event of a crash, damage in all likelihood is confined to the propeller and to its inexpensive readily replaceable mounting means.

With the foregoing and other objects in view, which will become more fully apparent as the nature of the invention is better understood, the same consists in a miniature internal combustion engine embodying a crank shaft construction and protective housing arrangement and means for mounting a propeller thereon, as will be hereinafter more fully described, illustrated in the accompanying drawing and defined in the appended claims.

In the accompanying drawing, wherein like characters of reference denote corresponding parts in the different views—

Figure 1 is a longitudinal section through a portion of a miniature internal combustion engine having a crank shaft and means for mounting a propeller thereon constructed in accordance with one practical embodiment of the invention.

Figure 2 is a cross section on the line 2—2 of Fig. 1; and

Figure 3 is a view similar to Fig. 1 illustrating a slightly alternative form of bolt for fastening the propeller to the crank shaft.

Referring to the drawing in detail, first with particular reference to the embodiment of the invention illustrated in Figs. 1 and 2, 10 designates a portion of the crank case or housing of a miniature internal combustion engine the construction and mode of operation of which, apart from its crank shaft and the manner of protectively supporting the same, is immaterial insofar as the present invention is concerned, 16 designates a bored boss extending forwardly from the front wall 10' of the crank case 10, and 14 designates the crank shaft of the engine journaled in said boss 16.

In accordance with the invention the outer end portion of the crank shaft 14 projects only a short distance beyond the outer end of the boss 16 and on its projecting outer end portion has firmly mounted in any suitable manner for rotation therewith a propeller-mounting abutment element 19 of disk-like form the inner end of which seats flatly against the outer end of the boss 16. Accordingly, the short, projecting end portion of said crank shaft is firmly supported and protected against becoming bent by the abutment element 19 due to the flat seating engagement of the inner end of said abutment element against the outer end of the boss 16.

Preferably the projecting end portion of the crank shaft 14 is of reduced diameter to afford a shoulder against which the inner end of the abutment element 19 abuts whereby inward movement of said abutment element relative to said crank shaft is limited to avoid binding of the inner end of the same against the outer end of the boss 16 and so that said abutment element affords a solid support against which to clamp a propeller 20.

In the crank shaft 14 is a threaded axial bore 14' of any suitable length which opens through the outer end of said crank shaft and in which is threaded a bolt 21 which extends through a central opening in the propeller 20, while on the outer end of said bolt is a head 21' of any suitable type which cooperates with the outer face of the hub portion of said propeller so that by tightening of said bolt the propeller is clamped firmly against the abutment element 19 and thereby is mounted firmly upon the crank shaft 14.

Since the main portion of the crank shaft 14 is supported and protected against becoming bent by the boss 16, and since the outer end portion of said shaft which projects beyond the end of said boss 16 is firmly supported and protected against becoming bent by the abutment element 19 in cooperation with the boss 16, it is apparent that in the event of the crash of an aircraft equipped with the present engine there is little likelihood of the crank shaft 14 becoming bent or damaged. On the contrary, the likelihood is that, regardless of whether the propeller breaks, only the inexpensive, readily replaceable bolt 21 will become bent or broken.

As illustrated in Fig. 1 of the drawing, the head and the shank of the bolt 21 are of one-piece construction, the head 21' being hollow and of acorn or streamlined shape and having openings 21a therein alined with a transverse opening 21b in the shank to accommodate a rod or the like for the purpose of turning the bolt to tighten or loosen the same. As distinguished from this construction, Fig. 3 illustrates a bolt in which the shank 21c is separate from the head 21d and is connected to said head by being threaded into a boss 21e in said head. In other respects the construction shown in Fig. 3 is the same as the construction shown in Fig. 1, the two-part bolt of Fig. 3 having the obvious advantages that it may be constructed more cheaply and easily with a considerable saving in metal as compared with the bolt shown in Fig. 1.

Without further description it is thought that the features and advantages of the invention will be readily apparent to those skilled in the art, and it will of course be understood that changes in the form, proportions and minor details of construction may be resorted to, without departing from the spirit of the invention and scope of the appended claims.

I claim:

1. A mounting for the propellers of miniature aircraft engines constructed to resist bending of the propeller driving means upon crashing, comprising, a hollow boss carried by the engine housing and having its outer end presenting a rigid abutment face, a crank shaft journalled in the boss and having an extension projecting beyond said abutment face of the boss, said crank shaft having an internal socket provided with threads, a propeller abutment non-rotatably secured to the said extension of the crank shaft and having its inner face solidly engaging the said abutment face at the end of the boss, a propeller including a hub whose inner side is engaged with the outer face of the propeller abutment, and a bolt having its head engaging the outer side of the propeller hub and also having its threaded shank passing through the hub and into said socket of the crank shaft.

2. A mounting for the propellers of miniature aircraft engines constructed to resist bending of the propeller driving means upon crashing, comprising, a hollow boss carried by the engine housing and having a flat surfaced outer end, a crank shaft journalled in the boss and having an extension of reduced diameter providing a shoulder disposed in co-planar relation to the flat surfaced end of the boss, said crank shaft having an internal socket provided with threads, an abutment non-rotatably and slidably fitted to the extension of the crank shaft and having a flat face engaging the co-planar flat surfaced end of the boss and the said shoulder of the crank shaft, a propeller including a hub interengaged with the face of the abutment opposite the face engaging the boss and shoulder, and a bolt having its head engaging the outer side of the propeller hub and also having its threaded shank passing through the hub and into said threaded socket of the crank shaft, whereby screwing the shank of the bolt into said socket clamps the propeller hub and abutment against the shoulder and boss.

THOMAS R. ARDEN.